Patented June 22, 1943

2,322,723

UNITED STATES PATENT OFFICE 2,322,723

ORGANIC INSECTICIDE COMPOSITION

David W. Young, Roselle, N. J., assignor, by mesne assignments, to Jasco, Incorporated, a corporation of Louisiana No Drawing. Application April 24, 1941, Serial No. 390,103

10 Claims. (Cl. 167—42)

This invention relates to the preparation of insecticide compositions containing certain organic compounds which have high toxicity to insects, but for which practical effectiveness is greatly dependent on a proper method of application. In particular, this invention relates to insecticide compositions in which the potent agent is preferably a normally solid heterocyclic organic compound harmless to higher forms of animal life.

Investigations have shown that there are a small number of organic compounds which have excellent possibilities as insecticides in view of their high potency shortly after application and which possess other valuable characteristics, such as insolubility in water and non-toxicity to higher animal life. These organic compounds have not been put to as much use as desired on account of their rapid loss in effectiveness and difficulties in finding a suitable medium for applying them to horticulture. The insecticides of this type are normally solid, but they have a tendency to vaporize or sublime in the atmosphere, and no suitable carrier was found in which they could be uniformly and effectively suspended. To improve this condition various wetting agents have been tried, such as bentonite, alcohol, acetone, tannic acid. Also a number of sticking agents have been tried, such as heavy metal soaps, latex, and the like, without satisfactory results.

There has not been a serious problem in applying inorganic insecticide agents, of which lead arsenate is a common example, since these agents are readily suspended in water and are inherently very persistent. However, objectionable features of the inorganic agents, particularly dangers from poisoning of higher animal life before and during the time of their use, and their tendency to leave residues poisonous in this respect, makes it desirable to replace them by the organic insecticides which are not toxic to higher animal life. However, to obtain full benefits from the organic insecticides non-toxic to higher animal life, it is important that this kind of insecticide be used in a composition with other ingredients which are likewise innocuous.

The purpose of this invention is to overcome previous drawbacks in the utilization of the organic insecticides, with prolongation of potency and improvement of conditions under which these insecticides are applied, and to adapt them for use with other ingredients to the best advantage.

Further objects of the present invention will become apparent from the following detailed description.

The highly potent organic insecticides with which this invention is particularly concerned are best represented by normally solid heterocyclic compounds which generally contain oxygen, and more specifically by the following compounds:

Phenothioxin, $C_{12}H_8OS$
Thioxanthone, $C_{13}H_8OS$
Thioxanthydrol, $C_{13}H_{10}OS$
2-thiocumarin, $C_9H_6OS$
2-phenylbenzoxazole, $C_{13}H_9NO$
Xanthone, $C_{13}H_8O_2$
Phenothiazine, $C_{12}H_9NOS$ These compounds have been regarded as some of the most promising organic insecticides which could be beneficially used with avoidance of poison residue so as to save fruit growers the expense of washing the sprayed fruit before marketing, and, also, with economies and greater safety in the preparation and marketing of insecticide compositions.

These insecticides are regarded as very important to the fruit industry, and have been shown in tests conducted by the United States Department of Agriculture and others to have a high killing power commensurate with that of lead arsenate. Tests on these compounds are described in the United States Department of Agriculture Circular No. 523 (May 1939). Also various field tests have been conducted on the same types of agents to prove their insecticidal value, but, as indicated, their effectiveness is very short lived unless they are applied appropriately, and the important problem has been to find a better suspension medium for them and means for making them more persistent.

This invention is based on my discovery that substantially saturated, linear-type polymers of iso-olefins, particularly the viscous liquid to plastic polymers of isobutylene, have a remarkable ability to maintain the described type of solid organic insecticides in a uniform suspension, while acting as an adhesive for the particles of insecticide and functioning effectively as a vaporization retardant to considerably reduce the loss of the insecticide.

The substantially saturated, linear-type of iso-olefin polymers herein proposed for use in combination with the normally solid organic insecticides are commercial products which are well-known. The nature of these polymers and the method for their production is described in U. S. Patent 2,130,507.

The most common and typical of these polymers are the isobutylene polymers, known as polybutenes, which are regarded as being composed predominantly of the following structural unit:

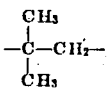

These polymeric compounds have molecular weights ranging from about 1000 upwardly and contain only one unsaturated double bond carbon-to-carbon linkage in a chain of 100 or more carbon atoms. An important use of these polymers has been as blending agents in mineral oils and waxes, in which they act as thickening agents and plasticizers; and in view of these properties, they have been suggested as ingredients for tree spray oils to be used therein in conjunction with high boiling but volatile mineral oils, such as kerosene, in which the oil acts as a toxic agent by reason of its suffocating effect on certain types of parasites, this type of insecticide being essentially a non-persistent type, since it is dependent on vaporization of the kerosene or oil for its effect.

In the insecticide compositions of the present invention, the iso-olefin polymer is employed to function as a suspension medium for finely divided solid particles of an organic insecticide ground to a fine dust or powder. When suspended in the polymer, the insecticide agent can be made to uniformly coat fruit or leaves and form a thin coating thereon in which the dispersed insecticide powder makes a substantially continuous thin sheath through which an insect, such as a codling moth, is forced to eat in order to gain entrance into the living tissue of the plant and is thereupon killed by the insecticide acting in the manner of a stomach poisoning.

Leaves and fruits coated by the herein provided insecticide compositions upon visual inspection demonstrate the very excellent qualities of protective film forming obtained. It can be seen that the powdered insecticide very fully covers the surface of sprayed specimens.

Also, it has been found that the isobutylene polymers can be used conveniently in an emulsion. It dispenses with the need of poisonous sticking agents, such as zinc soaps, and with the need of special spreading agents, such as soy bean flour, or other such materials which have been ordinarily found essential with the types of insecticides herein described.

It is preferred to employ from about 1 to 10 pounds of the active insecticide agent to 100 gallons of the carrier. The polymer is preferably admixed in a proportion of 2 to 10 per 100 gallons of carrier and has a molecular weight in the range of 1000 to 30,000, and preferably from 2000 to 15,000.

For obtaining more particularly a high increase in persistency and in formulating insecticide compositions best suited for plants sensitive to adverse effects of mineral oils, the mineral oils may be eliminated entirely. On the other hand, if greater wetting and penetration is desired, refined mineral oils may be admixed, and for this purpose, the mineral oil may be non-viscous and highly volatile, such as a naphtha fraction.

With the use of oil and water in a liquid carrier, small proportions of well-known, non-toxic oil-soluble type emulsifiers, such as A. G. Emulphor, may be used. Without oils but with an aqueous carrier, any of the well-known non-toxic water-soluble emulsifiers, such as alkali metal soaps of fatty acids, may be used. Inert spreading agents such as bentonite may be added in a proportion of about 1 to 5 pounds per 100 gallons of liquid carrier.

The desired types of ingredients for the composition are combined readily by mixing at ordinary temperatures, which is an important factor in simplifying the work of the user. In employing other types of ingredients, the user may be compelled to make the composition up for application with application of heat to the mixture of ingredients, and the heating often results in undesirable changes, such as curdling.

The insecticide compositions prepared with iso-olefin polymers have been made to contain exceptionally high concentrations of the active organic insecticide agents and to have an exceptionally high increase in persistency as will be illustrated in the following examples:

Examples and tests

Insecticide compositions were prepared in a manner to adapt the compositions for suitable spreading by a common hand gun spray of the Volck type. In order to evaluate the action of the iso-olefin polymer in these compositions, the desired type of organic insecticide agents were compounded with certain proportions of carriers, water, and emulsifying agents in duplicate sets with variations in the employment of polybutene having an average molecular weight of the order of 12,000. A number of insecticide compositions were compounded with total omission of any mineral oils, and in some of the sets of compositions, a water emulsion was used. The series of compositions formulated were sprayed in accordance with the usual practice on the surfaces of test specimens with the same type of spray gun and for an identical spraying period. Each of the sprayed coating deposits were analyzed shortly after spraying and at a period of 7 days later to determine the amount of the active insecticide which had been lost by volatilization or otherwise.

Results of the tests on the various insecticide compositions are summarized in the following table:

| Insecticide composition | Total spraying time | Active organic insecticide in coating deposit mg./sq. in. | | Percentage active insecticide loss from surface coating |
|---|---|---|---|---|
| | | After ½ hour | After 7 days | |
| 2 lbs. phenothioxin, 20 gal. naphtha, 80 gal. H₂O, 1 lb. A. G. Emulphor, 1 lb. bentonite | Sec. 15 | 0.297 | 0.154 | 51 |
| 2 lbs. phenothioxin, 20 gal. naphtha, 80 gal. H₂O, 1 lb. A. G. Emulphor, 1 lb. bentonite, 3.4 lbs. polybutene | 15 | 0.318 | 0.239 | 25 |
| 2 lbs. phenothioxin, 4 lbs. bentonite, 100 gal. H₂O | 15 | 0.213 | 0.084 | 60.5 |
| 2 lbs. phenothioxin, 100 gal. H₂O, 0.5 lb. sodium oleate, 3.4 lbs. polybutene | 15 | 0.269 | 0.263 | Trace |
| 2 lbs. xanthone, 100 gal. H₂O, 0.5 lb. sodium oleate, 3.4 lbs. polybutene | 15 | 0.264 | 0.260 | Trace |
| 2 lbs. xanthone, 100 gal. naphtha | 15 | 0.310 | 0.116 | 62.6 |
| 2 lbs. xanthone, 100 gal. naphtha, 6.7 lbs. polybutene | 15 | 0.310 | 0.284 | 20.0 |
| 2 lbs. xanthone, 1 lb. A. G. Emulphor, 50 gal. H₂O, 50 gal. naphtha | 15 | 0.188 | 0.050 | 73.0 |
| 2 lbs. xanthone, 1 lb. A. G. Emulphor, 50 gal. H₂O, 50 gal. naphtha, 3.5 lbs. polybutene | 15 | 0.213 | 0.120 | 44.0 |

From an examination of data presented, it is evident that the iso-olefin polymer ingredient considerably retarded the loss of the active insecticide, and did so substantially to perfection in the abesnce of a volatile petroleum oil. In all instances, the decrease and loss of the active organic insecticide was sufficiently reduced by the polymer to at least double the persistency of the agent, and the spray deposit was satisfactorily uniform with the polymer present.

Since the iso-olefin polymer is physiologically harmless to higher animal life, including human beings, the insecticide compositions may be prepared with the likewise harmless insecticide agent to eliminate the trouble of marketing the ingredients separately. However, the present invention is adapted for other general methods of application; for example, the plants may be sprayed with a composition containing the polymer and subsequently be dusted by the organic insecticide, or the insecticide compositions may be applied to the plants in various well-known ways where protection is desired against insects.

It is not intended that the invention be limited to the examples given for the purpose of illustration, for many modifications thereof come within the spirit of the invention as defined in the appended claims.

I claim:

1. A persistent stomach poisoning insecticide spray composition comprising essentially a normally solid organic insecticide of heterocyclic composition in powdered form suspended in a viscous to plastic iso-olefin polymer having an average molecular weight of above about 1,000.

2. A persistent stomach poisoning insecticide composition harmless to human beings, comprising a normally solid insecticide of the solid heterocyclic organic type dispersed in a viscous to plastic isobutylene polymer having a molecular weight above 1000.

3. A highly persistent stomach poisoning insecticide composition comprising a normally solid organic insecticide having a heterocyclic structure containing oxygen dispersed in a viscous to plastic isobutylene polymer having a molecular weight above 1000, said composition being substantially free of any volatile oil ingredient.

4. A persistent insecticide composition comprising powdered phenothioxin as the active insecticide agent dispersed in an isobutylene polymer having a molecular weight ranging from 1000 to about 30,000.

5. A persistent insecticide composition essentially containing powdered xanthone as the active insecticide agent dispersed in a viscous isobutylene polymer having a molecular weight above 1,000.

6. A persistent insecticide composition essentially containing 2-thiocumarin as the active insecticide agent dispersed in a viscous isobutylene polymer having a molecular weight above 1000.

7. A method of increasing the persistency of a powdered normally solid organic insecticide in the protection of vegetation and high forms of animal life against parasitic attack and against poisoning action by the harmful effects from the insecticide composition, which comprises using a normally solid organic stomach poisoning insecticide which is physicologically harmless to higher forms of animal life dispersed in a viscous isobutylene polymer having a molecular weight above 1000 with other ingredients that are likewise harmless to higher animal life.

8. A stomach poisoning insecticide spray composition containing a normally solid organic insecticide of heterocyclic composition in admixture with water, a minor amount of a water-soluble emulsifier, and a viscous to plastic isobutylene polymer having a molecular weight above 1000.

9. A stomach poisoning insecticide spray composition containing a solid organic insecticide of heterocyclic composition in a carrier comprising a volatile non-viscous refined mineral oil and water, a non-toxic oil-soluble emulsifier, and an isobutylene polymer having a molecular weight ranging from about 2000 to 15,000.

10. An insecticide composition in accordance with claim 9, containing bentonite.

DAVID W. YOUNG.